Dec. 23, 1941.   T. A. BOWERS   2,267,369
PISTON RING
Filed Aug. 4, 1939   2 Sheets-Sheet 1
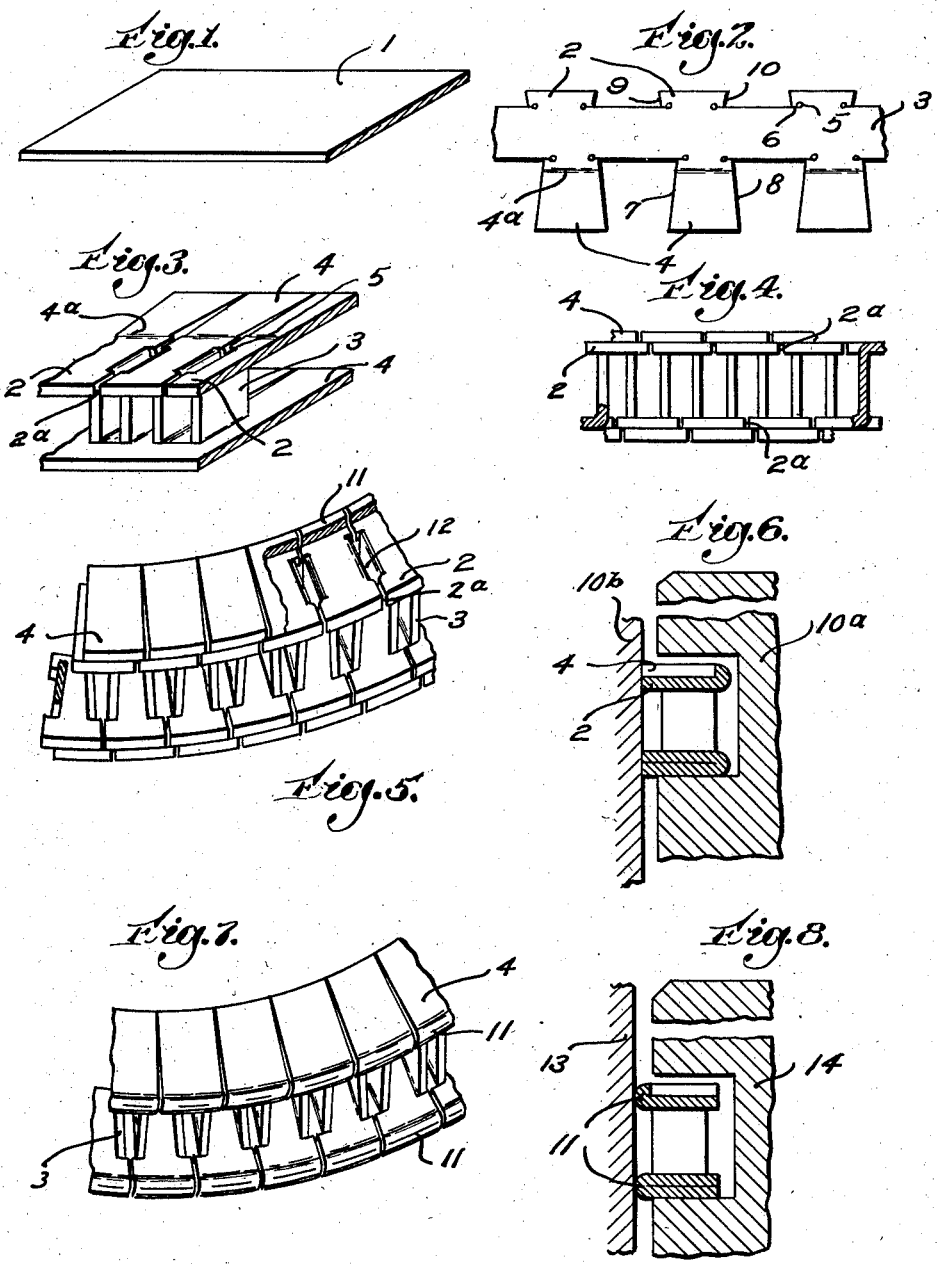

Dec. 23, 1941.   T. A. BOWERS   2,267,369
PISTON RING
Filed Aug. 4, 1939   2 Sheets-Sheet 2
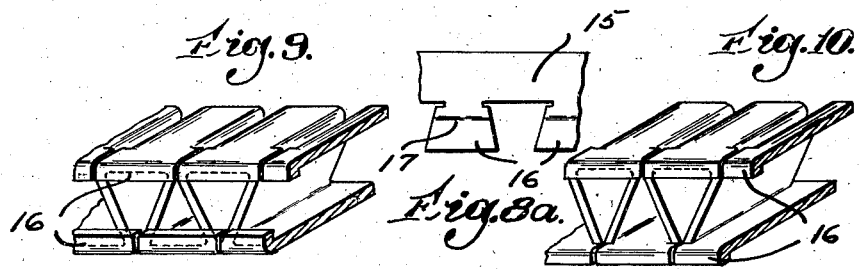
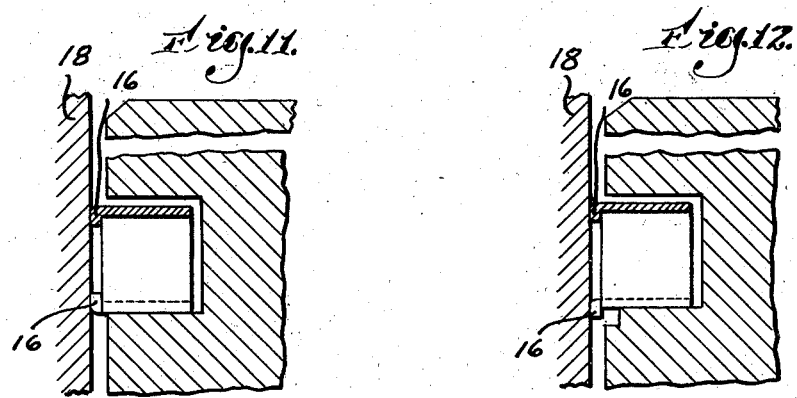
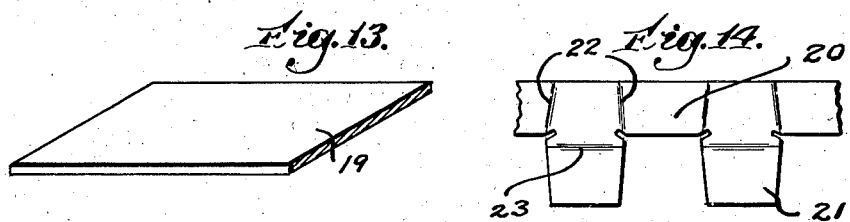
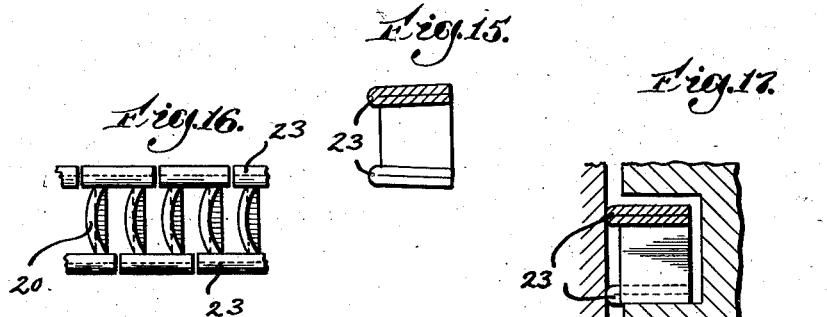

Patented Dec. 23, 1941

2,267,369

UNITED STATES PATENT OFFICE 2,267,369

PISTON RING

Thomas A. Bowers, Boston, Mass., assignor to Power Research Corporation, Boston, Mass., a corporation of Massachusetts Application August 4, 1939, Serial No. 288,386

10 Claims. (Cl. 309—45)

This invention relates to piston rings and more especially to a piston ring formed from a strip of piston ring material.

In my co-pending application, Ser. No. 268,721 filed April 19, 1939, reference has been made to difficulties in maintaining proper distribution of oil in cylinders, particularly worn cylinders, at high engine speeds, and I have described and claimed ring structures formed from resilient piston ring material.

A chief object of this invention is to provide improved ring structures, of the same general character, for effecting oil distribution on a cylinder wall with a view to particularly overcoming faulty oil distribution in cylinders which have become worn and which are subject to high-speed operation. The invention also aims to devise a simple, cheap and efficient piston ring structure and method of manufacture, in which a single strip of piston ring material is formed and fabricated into a piston ring in an improved manner.

The nature of the invention will be readily understood from the following description when read in connection with the accompanying drawings, and the novel features will be more particularly pointed out in the appended claims.

In the drawings:

Fig. 1 is a perspective view of a strip of piston ring material as employed in my invention.

Fig. 2 is a plan view illustrating a step of forming a strip of material such as that shown in Fig. 1 with oil scraping portions.

Fig. 3 is a perspective view illustrating a further step of reversely folding upon itself the formed material of Fig. 2.

Fig. 4 is an elevational view illustrating a still further step in the formation of a ring body from a material such as shown in Fig. 3.

Fig. 5 is a perspective view fragmentarily illustrating a finished ring resulting from the step indicated in Fig. 4.

Fig. 6 is an assembly view fragmentarily illustrating a piston and cylinder with a ring such as that shown in Fig. 5 associated therewith.

Fig. 7 is a modification of the ring illustrated in Fig. 5.

Fig. 8 is another assembly view illustrating the association of a ring such as that indicated in Fig. 7 with a piston and cylinder.

Fig. 8a is a fragmentary plan view illustrating a stamping or cutting out operation similar to that indicated in Fig. 2.

Fig. 9 is a perspective view illustrating a finished ring formed from a material such as that shown in Fig. 8a.

Fig. 10 is a perspective view fragmentarily illustrating a further modification of ring formed from a strip such as that shown in Fig. 8a.

Fig. 11 illustrates the ring indicated in Fig. 9 mounted in a piston and cylinder.

Fig. 12 illustrates association of the ring indicated in Fig. 10 with a piston and cylinder.

Fig. 13 is a perspective view illustrating another strip of piston ring material.

Fig. 14 is a plan view illustrating a modified stamping step effected on a strip of material such as that illustrated in Fig. 13.

Fig. 15 is a detail view in partial cross section illustrating a single folding of the material indicated in Fig. 14.

Fig. 16 is an elevational view fragmentarily illustrating a finished ring formed from material such as that indicated in Fig. 14; and Fig. 17 is a view in cross section illustrating a piston and cylinder assembly.

In accordance with my invention, I provide a strip of piston ring material 1, which may preferably be composed of steel, although other suitable materials may be employed if desired. I treat this ribbon by cutting and folding operations to produce improved types of oil scraping edges in a ring structure.

Fig. 2 illustrates a cutting operation as for example punching, by which it will be observed that there are found in the strip 1 oil scraping portions 2 occurring at one side of a body portion 3, and relatively larger oil scraping portions 4 occurring at an opposite side of the body portion 3. In carrying out the punching operation, I may also provide circular openings 5 connecting with lines of cutting 6 for facilitating bending of the body portion 3 reversely upon itself.

In Fig. 3 the body portion 3 has been reversely folded to comprise an open structure in which oil scraping edges 2 and 4 are alternately disposed in spaced-apart rows at opposite sides of the body portion. It will be observed that the body portion 3 has been neatly folded at the openings 5, which results in an accurate arrangement of oil scraping portions in the reversely folded structure with gaps 2ª occurring between portions 2.

In Fig. 4 I have illustrated the further step of folding the oil scraping portions 4 over upon the oil scraping portions 2 along the line of bending 4ª, to comprise double oil scraping edges. The structure is thereafter compacted into an annular body in which the scraping edges described comprise an outer contacting periphery. It will be noted that the edges 7 and 8 are offset with respect to edges 9 and 10, and the oil scraping portions 4 occur in an overlying manner with respect to the gaps between any two adjacent oil scraping portions 2 so that there results a sealing action to prevent oil from passing through the gaps 2ª in the ring structure at its top and bottom.

In Fig. 5 the arrangement of the oil scraping portion 4 has been more clearly illustrated and it will be seen that the inner periphery of the ring is comprised by rounded edges 11. It should also be observed that by folding over the oil scraping portion 4 upon portions 2, there results a substantial covering over of spaces 12 occurring between points of bending of the body portion 3, which, in addition to the staggered relationship of the gaps already described, tends to further preclude the passage of oil through the top or bottom of the ring. The covering of spaces 12 is also illustrated in Fig. 6 in which the ring of Fig. 5 has been shown associated about a piston 10ª with the double edges engaged against a cylinder wall 10ᵇ.

In Figs. 7 and 8 I have illustrated a modified arrangement of ring formed from a material such as that indicated in Fig. 4. In this modification, the reversely folded material is compacted into an annular body in an opposite manner so that the rounded edges 11 occurring from folding over the portions 4 upon the portions 2 comprise the outer periphery of the ring and present oil scraping edges adapted to contact the cylinder wall 13 when assembled in a piston 14, and seen in Fig. 6. This arrangement of oil scraping edges has the advantage of providing a rounded form which may allow a quicker "wearing in" of the ring against a cylinder wall.

In Figs. 8 and 9, I have illustrated another modified method of forming a piston ring from a strip of piston ring material. I provide a stamping 15 from a strip of piston ring material, which is provided with cut out oil scraping portions 16 along only one side of the strip of material. The strip of material is reversely folded upon itself in the manner already described, and the oil scraping portions 16 are then folded over on the lines of folding 17 to present a structure such as that illustrated in Fig. 9 with the scraping portions being bent to provide downwardly bent edges at the top of the ring and upwardly turned edges at the bottom of the ring as shown in Fig. 9. If desired, other arrangements of the oil scraping edges 16 may be resorted to as for example that shown in Fig. 10 in which scraping portions are folded down at both the top and bottom sides of the ring structure. The effect of this modification of ring structure is to provide a simple rounded oil scraping edge which may be quickly worn in on a cylinder wall 18 as shown in Figs. 11 and 12.

In Figs. 13-17 inclusive, I have shown still another modified method of forming a piston ring structure from a single ribbon of material. A strip 19 is punched out or cut in some other desirable manner to present a structure such as that shown in Fig. 14 in which there occurs a body portion 20 having oil scraping portions 21. In this modification, the body portion 20 is reversely folded upon angular lines of bending 22 which results in one side of the ring being formed lower than the other, and as before the oil scraping portions 21 are bent along the lines of bending 23 and shaped to coincide with the opposite edge of the body portion 20. It will be noted that the body portion 20 at one side will be bent in an arcuate manner as shown in Fig. 16, while at its rear and lower edge it will be substantially vertical as shown in Fig. 16.

It will be seen that in the construction shown I have devised a piston ring structure from a single length of piston ring material which effects novel sealing at its top and bottom and which develops a desirable wall pressure adapted to efficiently distributing oil on a cylinder. Also novel modifications for improving the forming of rings and their operation have been set forth.

It is intended that various changes in the structure and steps employed may be resorted to in keeping with the spirit of the invention.

I claim:

1. A piston ring comprising spaced-apart sides, connecting portions for the sides, said sides formed from a plurality of segments arranged in contiguous relation and extending beyond the connecting portions in a direction radially outward of the ring, each of said segments having bent portions which provide rounded edges constituting portions of a peripheral edge of the ring.

2. A piston ring comprising spaced-apart sides, connecting portions for the sides, said sides formed from a plurality of segments arranged in annular spaced-apart rows, each of said segments having bent portions which extend along a peripheral edge of the ring in a direction circumferentially thereof.

3. A piston ring comprising a plurality of T-shaped segments arranged in contiguous relation to form spaced-apart annular rows, connecting web portions for the rows, each of said segments having a bent peripheral edge which extends axially of the ring.

4. A piston ring comprising spaced-apart sides, connecting webs for the sides, said sides including a plurality of segments of piston ring material arranged in contiguous relation in annular rows, said sides further including rows of relatively greater segments attached along edges of the said first segments and adapted to overlap points of abutment of the said first segments.

5. A piston ring comprising spaced-apart sides, connecting portions for the sides, each of said sides including a row of contiguously arranged segments, other segments overlying the said first segments and being connected to the said first segments by bent portions which extend circumferentially along one of the peripheral edges of the ring.

6. A piston ring comprising spaced-apart sides, connecting webs for the sides, each of said sides including segments which are circumferentially movable with respect to one another, said segments formed of a plurality of layers of piston ring material connected together at the inner periphery of the ring.

7. A piston ring comprising a plurality of segments of piston ring material arranged in contiguous relation to form spaced-apart annular rows, said rows connected by web portions, each of said segments having a relatively larger overlying crown portion which extends circumferentially of the ring in overlapping relation with respect to a point of abutment of two of the said first segments.

8. A piston ring comprising a plurality of segments arranged in contiguous relation to form spaced-apart annular rows, connecting portions for the said rows of segments, said segments including a plurality of layers of piston ring material connected together at outer peripheral edges of the ring.

9. A piston ring comprising a plurality of segments arranged in contiguous relation to form spaced-apart annular rows, connecting portions for the said rows of segments, other segments overlying the said first segments and being connected to the said first segments at the inner periphery of the ring.

10. A piston ring comprising upper and lower land surfaces, said land surfaces formed with a plurality of contiguously arranged segments, connecting portions for the segments in the respective land surfaces, said connecting portions being bent into an arcuate shape at one side thereof to form a ring of a greater axial height at its outer periphery than at its inner periphery.

THOMAS A. BOWERS.